(12) United States Patent
Kawai et al.

(10) Patent No.: US 9,142,993 B2
(45) Date of Patent: Sep. 22, 2015

(54) CHARGE CIRCUIT, AND BATTERY-CHARGER ASSEMBLAGE WITH THE CHARGE CIRCUIT

(71) Applicant: Panasonic Corporation, Osaka (JP)

(72) Inventors: Akira Kawai, Shiga (JP); Masaki Ikeda, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 317 days.

(21) Appl. No.: 13/705,540

(22) Filed: Dec. 5, 2012

(65) Prior Publication Data

US 2013/0154578 A1   Jun. 20, 2013

(30) Foreign Application Priority Data

Dec. 15, 2011   (JP) ................. 2011-274477

(51) Int. Cl.
*H02J 7/00* (2006.01)
*H02J 7/04* (2006.01)
*H02J 7/16* (2006.01)

(52) U.S. Cl.
CPC ............... *H02J 7/0073* (2013.01); *H02J 7/045* (2013.01); *H02J 7/0004* (2013.01)

(58) Field of Classification Search
CPC ...................................... Y02E 60/12
USPC ......................................... 320/132
See application file for complete search history.

(56) References Cited

U.S. PATENT DOCUMENTS

| 5,635,813 | A | 6/1997 | Shiga et al. |
| 5,654,623 | A | 8/1997 | Shiga et al. |
| 6,433,515 | B2 | 8/2002 | Sakakibara |
| 2001/0035732 | A1 | 11/2001 | Sakakibara |
| 2005/0200331 | A1* | 9/2005 | Patino et al. ................. 320/128 |
| 2007/0108945 | A1 | 5/2007 | Ohashi et al. |
| 2008/0129252 | A1* | 6/2008 | Nishino ........................ 320/162 |

FOREIGN PATENT DOCUMENTS

| JP | 04-197043 A | 7/1992 |
| JP | 07-176333 A | 7/1995 |
| JP | 2001-298870 A | 10/2001 |
| JP | 2003-087991 A | 3/2003 |

(Continued)

OTHER PUBLICATIONS

European Search Report for corresponding European Application No. 12196844.0 dated Nov. 11, 2013.

*Primary Examiner* — Edward Tso
*Assistant Examiner* — Ahmed Omar
(74) *Attorney, Agent, or Firm* — Renner, Otto, Boisselle & Sklar, LLP

(57) ABSTRACT

A charge circuit is composed of a first circuit and a second circuit. Said second circuit is provided at a battery pack in which a secondary battery is comprised. Said first circuit is provided at a charger for charging said secondary battery. Said charge circuit comprises: an output power supply section; a control section configured to control said output power supply section to perform a charging operation; a memory provided at said second circuit and storing a number of charging; and a threshold current setting section. Said control section is configured to, in said charging operation, perform firstly a constant current charging operation, and then perform a constant voltage charging operation, and finish the charging operation when a charging current reaches a charge stop current value. Said threshold current setting section is configured to decrease said charge stop current value along with the increase of said number of charging.

3 Claims, 7 Drawing Sheets

(56) References Cited

FOREIGN PATENT DOCUMENTS

| JP | 2005-073434 A | 3/2005 |
| JP | 2007-143279 A | 6/2007 |
| JP | 2010-081683 A | 4/2010 |
| JP | 2011-205839 A | 10/2011 |

* cited by examiner

A

B

A

B

| Number of Charging (times) | Charge Stop Current Value (mA) |
|---|---|
| 1 | 2000 |
| 100 | 1000 |
| 200 | 800 |
| 300 | 600 |
| ⋮ | ⋮ |
| 1000 | 200 |
| ⋮ | ⋮ |

A

B

CHARGE CIRCUIT, AND BATTERY-CHARGER ASSEMBLAGE WITH THE CHARGE CIRCUIT

TECHNICAL FIELD

This invention relates to a charge circuit for charging a secondary battery provided at a battery pack, and a battery-charger assemblage including the charge circuit.

BACKGROUND ART

It has been known a battery pack including a rechargeable secondary battery used for a power supply of an electric equipment such as an electric tool, mobile phone or the like. The secondary battery can be charged by an output power supply section in a charger by attaching the battery pack to the charger so as to electrically connect the secondary battery to the output power supply section.

For example, Japanese patent application publication No. 2007-143279A discloses a charge circuit for charging the secondary battery using the output power supply section. A control section of the charge circuit performs a constant current charging operation and a constant voltage charging operation. In the constant current charging operation, the control section keeps a charging current at a substantially constant and gradually increases a charging voltage. In the constant voltage charging operation, the control section keeps the charging voltage at a substantially constant and gradually decreases the charging current. That is, in a charging operation, the control section firstly performs the constant current charging operation, and switches the operation into the constant voltage charging operation upon the charging voltage reaches at a set value (at a threshold voltage) during the constant current charging operation. Upon the charging current reaches a predetermined threshold (charge stop current value) during the constant voltage charging operation, the control section finishes the charging operation as a completion of charging.

The secondary battery of the battery pack deteriorates (for example, internal resistance thereof increases) by repeating the charging/discharging. The deterioration of the second battery affects a charging time of the constant current charging operation and the constant voltage charging operation. For example, the internal resistance of the lithium-ion battery increases along with the repetition of the charging/discharging. In this instance, the charger obtains the charging voltage as a sum of an electromotive force of the battery and a voltage generated by the internal resistance of the battery. Therefore, in case of charging the deteriorated battery (the battery having increased internal resistance), the charging voltage reaches the set value with a smaller electromotive force compared with the case of charging the non-deteriorated battery. As shown in FIG. 8, in case of charging the repeatedly charged battery (refer to FIG. 8B), a time point at which the charging voltage reaches to the set value during the constant voltage charging operation shifts toward earlier timing compared with a case of charging a fresh battery (refer to FIG. 8A) such as a new one. In other words, in case of charging the repeatedly charged battery, the charging time by the constant current charging operation becomes shorter than the case of charging the fresh one. Therefore, in case of charging the repeatedly charged battery (battery at the end of life), the charging operation is switched into the constant voltage charging operation even at a condition where the charge amount by the constant current charging operation is smaller compared with the case of charging the fresh battery (battery at the beginning of life).

Furthermore, because the charge stop current value A10 is constant, the charger finishes the constant voltage charging operation of the deteriorated battery (the battery having increased internal resistance) at a smaller electromotive force compared with the case of charging the fresh battery. Explaining it in other words, considering a charging current curve (refer to "L1" in FIG. 8), a gradient of the charging current curve with respect to the constant voltage charging operation becomes smaller along with the increase of the internal resistance of the battery. Herein, a chargeable amount E10 (refer to FIG. 8) of the secondary battery can be defined by a time integral of the charging current. Then, the actually charging amount E11 by the charging operation is obtained by a time integral of the charging current from the start of charging to a time corresponding to the charge stop current value A10. Then, a region indicated by E12 remains as a non-charging amount by the charging operation. Therefore, because the charge stop current value A10 is constant, a ratio of the non-charging amount E12 with respect to the chargeable amount E10 becomes larger along with the increase of the number of charging (refer to FIGS. 8A, 8B). That is, charge amount of the repeatedly charged battery becomes smaller than that of the fresh battery.

DISCLOSURE OF INVENTION

The object of the present invention is to provide a charge circuit and a battery-charger assemblage which can charge a sufficient amount of electric power to the repeatedly charged battery with compensating the reduction of charge amount due to the increase of the number of charging.

In order to achieve the above object, a charge circuit of the present invention is composed of a first circuit and a second circuit, said second circuit being provided at a battery pack in which a secondary battery is comprised, said first circuit being provided at a charger for charging said secondary battery in said battery pack, wherein said charge circuit comprises: an output power supply section which is configured to output an electric power to said secondary battery; a control section which is configured to control said output power supply section to perform a charging operation, wherein said control section is configured to, in said charging operation, perform firstly a constant current charging operation, perform next a constant voltage charging operation, and finish the charging operation when a charging current reaches a charge stop current value; a memory which stores a number of charging defined as the number of times of performing said charging operation, said memory being provided at said second circuit in said battery pack; and a threshold current setting section configured to determine said charge stop current value, wherein said threshold current setting section is configured to decrease said charge stop current value along with the increase of said number of charging.

The charging circuit is preferred that wherein said threshold current setting section is provided at said first circuit in said charger.

The charging circuit is preferred that wherein said threshold current setting section is provided at said second circuit in said battery pack.

The charging circuit is preferred that wherein said charge circuit comprises: a current measurement section for measuring a current flowing from said output power supply section to said secondary battery; and a voltage measurement section for measuring a voltage of said secondary battery, and wherein said control section is configured to: control said output power supply section so that the current measured by said current measurement section corresponds to a predetermined target current value in said constant current charging operation; and control said output power supply section so that the measured voltage of said voltage measurement section corresponds to a predetermined target voltage value in said constant voltage charging operation.

The charging circuit is preferred that wherein said voltage measurement section is provided at said second circuit in said battery pack.

A battery-charger assemblage of the present invention comprising: at least one chargers; and at least one battery packs, wherein each of said at least one chargers is provided with said first circuit, and wherein each of said at least one battery packs is provided with said second circuit.

According to the present invention, a sufficient amount of electric power can be charged to the repeatedly charged battery with compensating the reduction of charge amount due to the increase of the number of charging.

BRIEF DESCRIPTION OF DRAWINGS

FIG. 2A shows a charging current and a charging voltage in a constant current charging operation and a constant voltage charging operation, and FIG. 2B shows a completion time of the constant voltage charging operation and a charging amount of the charging operation;

FIG. 3A is related to a fresh second battery, and FIG. 3B is related to a second battery which is repeatedly charged;

FIG. 8A is related to a fresh second battery, and FIG. 8B is related to a second battery which is repeatedly charged.

DESCRIPTION OF EMBODIMENTS

The present invention is explained below with reference to embodiments illustrated in attached drawings.
(First Embodiment)

Figures 4, 5:
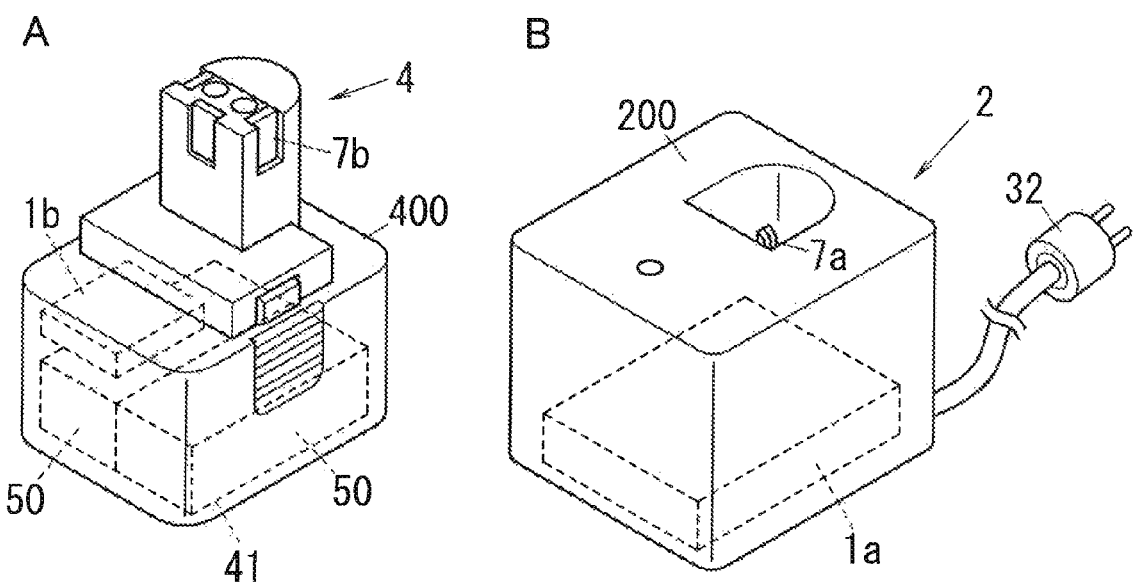
FIG. 4 is an explanatory diagram showing a relation between a number of charging and a charge stop current value of the charge circuit according to the first embodiment of the present invention.
FIG. 5 is a diagram showing a battery-charger assemblage according to the first embodiment of the present invention.

FIG. 5 shows a battery-charger assemblage of the present embodiment. The battery-charger assemblage of the present embodiment is composed of at least one ("one" in the example of FIG. 5) battery packs 4 each of which is provided with a secondary battery 41 therein, and at least one ("one" in the example of FIG. 5) charger 2 for charging the secondary battery 41 of the battery pack 4.

The charger 2 includes a charger main body 200, an internal circuit (a first circuit) 1a, a plug 32 connected to the internal circuit 1a, and terminals 7a (output terminals 71a and 72a; and control terminals 73a and 74a) connected to the internal circuit 1a. The internal circuit 1a is housed in the charger main body 200. The battery pack 4 includes a battery pack main body 400, an internal circuit (a second circuit) 1b, the second battery 41 connected to the internal circuit 1b, and terminals 7b (input terminals 71b and 72b; and control terminals 73b and 74b) connected to the internal circuit 1b. The secondary battery 41 includes at least one ("two" in the example of FIG. 5) battery cells 50. The internal circuit 1b and the secondary battery 41 are housed in the battery pack main body 400. When connecting the plug 32 to an external power supply 8 such as a commercial power supply, and connecting the terminals 7a of the charger 2 to the terminals 7b of the battery pack 4, thereby the secondary battery 41 of the battery pack 4 can be charged. The battery pack 4 is mounted to an electric equipment such as an electric tool, and supplies an electric power to the electric equipment. Note that, outer shapes of the charger 2 and battery pack 4 are not limited to those shown in FIG. 5.

Figure 1:
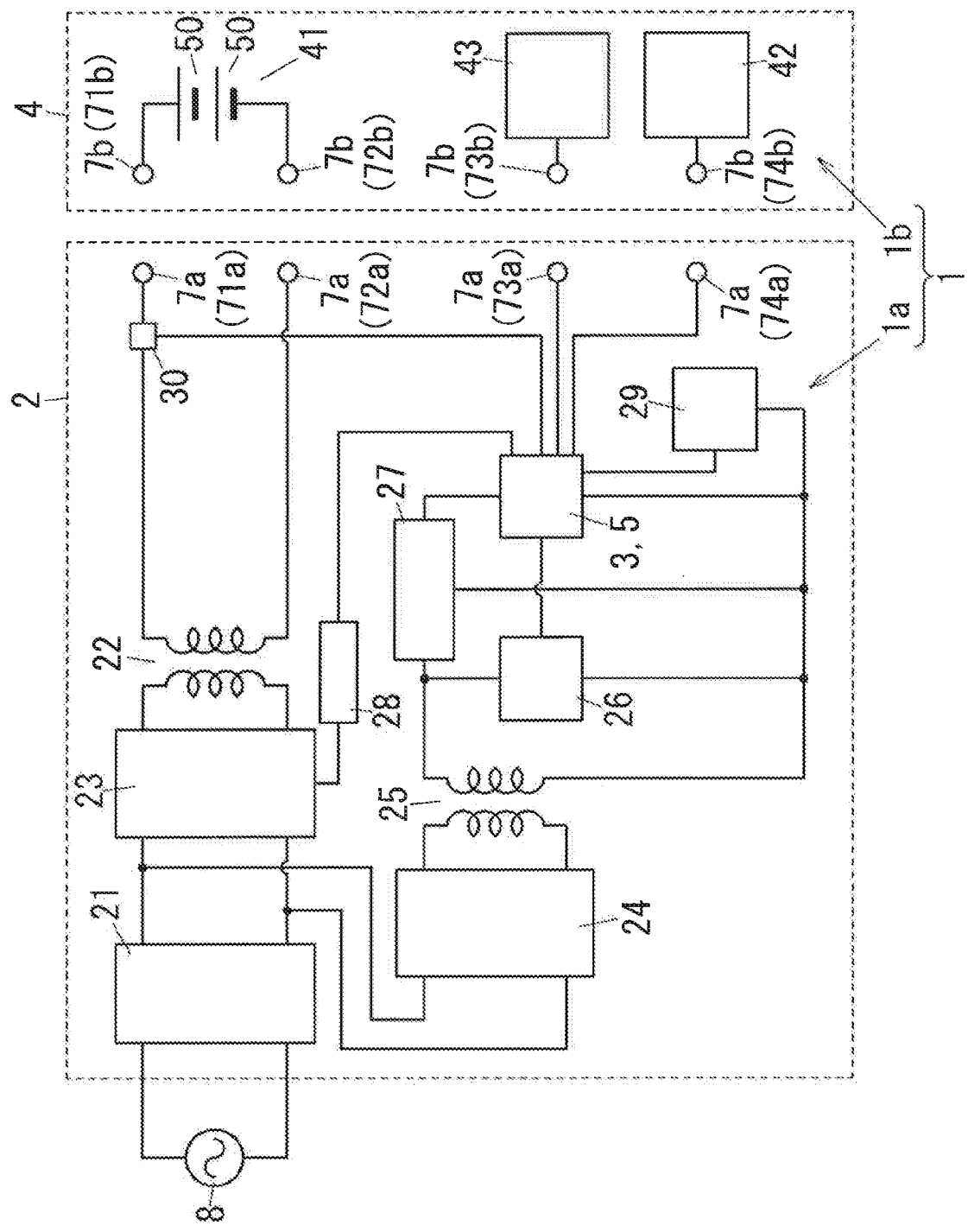
FIG. 1 is a circuit diagram of a charge circuit according to a first embodiment of the present invention.

As shown in FIG. 1, a charge circuit 1 of the present embodiment is composed of the internal circuit (the first circuit) 1a provided at the charger 2 and the internal circuit (the second circuit) 1b provided at the battery pack 4. The internal circuit 1a of the charger 2 and the internal circuit 1b of the battery pack 4 are connected through the terminals 7a (71a, 72a, 73a, 74a) and the terminals 7b (71b, 72b, 73b, 74b).

The internal circuit 1a of the charger 2 of the present embodiment includes: an output power supply section; a transformer for charging (a first transformer) 22, a control power supply block 24; a transformer for control (a second transformer) 25; a peripheral section 26; a voltage conversion section 27; a photo coupler 28; an informing section 29; a control section 3; and a current measurement section 30. The output power supply section includes a rectification block 21 and a current output section 23.

The rectification block 21 is connected to the plug 32. The rectification block 21 includes a full-wave rectifier or the like for rectifying an AC power supplied from the external power supply 8. The electric power rectified by the rectification block 21 is applied to the transformer for charging 22. The charger 2 charges the secondary battery 41 by supplying the output of the transformer for charging 22 to the secondary battery 41 through the terminals 7a (71a, 72a), 7b (71b, 72b). Note that, a rectification-smoothing circuit (including such as a rectification diode and a smoothing capacitor) is provided between the transformer for charging 22 and the output terminals (71a, 72a). The current output section 23 is provided between the rectification block 21 and the transformer for charging 22. The current output section 23 is configured to start/stop of the power feeding to the transformer for charging 22, and adjust the current flowing to the transformer for charging 22. The current output section 23 is preferably provided with a switching element. The control section 3 controls the switching frequency of the switching element of the current output section 23. The current measurement section 30 (such as a resistance) is provided at the secondary side of the transformer for charging 22. The current measurement section 30 is adapted to measure the current (charging current) flowing from the output power supply section to the secondary battery 41.

The control power supply block 24 is connected to the rectification block 21. Electric power adjusted by the control power supply block 24 is supplied to the control section 3 through the transformer for control 25. The secondary side of the transformer for control 25 is connected with the control section 3, a peripheral section 26 of a smoothing capacitor and the like, and the voltage conversion section 27 (such as a three-terminal regulator) for stabilizing an electric power. The photo coupler 28 is provided between the control section 3 and the current output section 23. The control section 3 controls the current output section 23 (the output power supply section) in an electrically-insulated manner through the photo coupler 28.

The internal circuit 1b of the battery pack 4 includes a memory 42 and a constant voltage control element 43 (a voltage measurement section) for a charging operation. The memory 42 stores an identification information and a lifetime information of the battery pack 4 as a memory information. The identification information is used for the control section 3 to identify an initial-value of a charge stop current value and a rated voltage of the battery pack 4. The identification information may be an ID number. The lifetime information includes a number of charging which is defined as a number of times of performing a charging operation. That is, the memory 42 stores the identification information and the number of charging of the battery pack 4.

The constant voltage control element 43 is adapted to measure a voltage of the secondary battery 41 (and/or the battery cell 50) and to output the measured value (measured voltage value) to the control section 3. The constant voltage control element 43 is preferred to measure a voltage across terminals 71b, 72b. The voltage value measured by the constant voltage control element 43 is sent to the control section 3 of the charger 2 through the terminals 73a and 73b.

The control section 3 of the present embodiment has a constant current charging mode and a constant voltage charging mode. In the constant current charging mode, the control section 3 controls the current output section 23 (the output power supply section) so as to keep the output current from the current output section 23 constant (i.e. keep the measured value by the current measurement section 30 constant) (constant current charging operation). In the constant voltage charging mode, the control section 3 controls the current output section 23 (the output power supply section) to gradually decrease the output current from the current output section 23 so that the voltage value of the secondary battery 41, which is input from the constant voltage control element 43, does not exceed a predetermined value. That is, in the constant voltage charging mode, the control section 3 controls the current output section 23 (the output power supply section) so as to keep the voltage of the secondary battery 41 constant (constant voltage charging operation).

When performing the charging operation (performing a control of charging), the control section 3 reads the memory information (the identification information and the lifetime information) from the memory 42 of the battery pack 4 mounted (attached) to the charger 2. Then, the control section 3 performs the charging operation using the memory information obtained from the memory 42.

Figure 2:
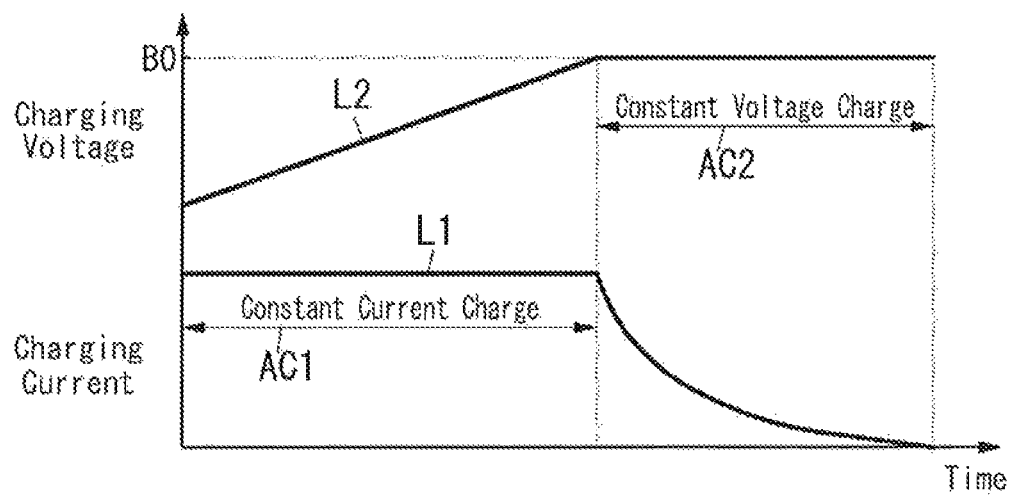
FIG. 2 is an explanatory diagram about charging operation of the charging circuit according to the first embodiment of the present invention.
Figure 2:
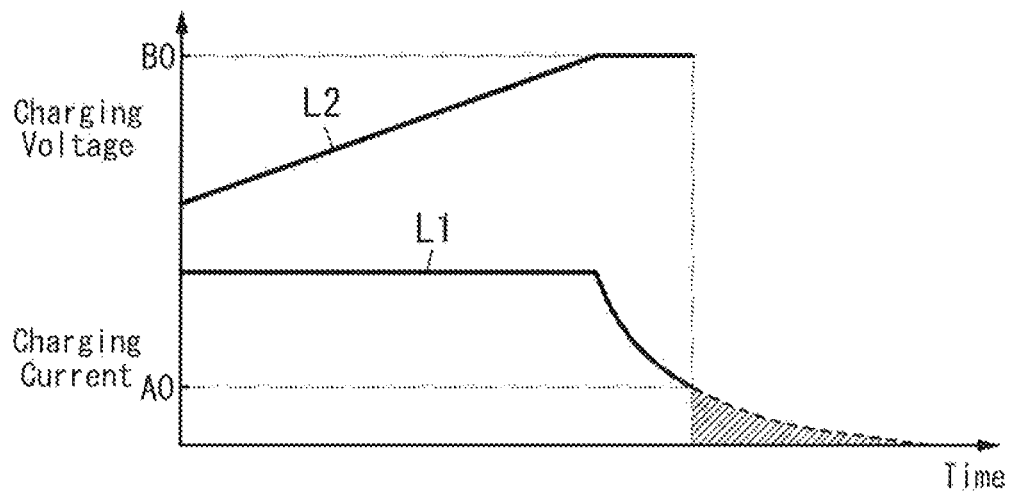

In the charging operation, as shown in FIG. 2A, the control section 3 starts to charge by way of the constant current charging operation in which a charging current ("L1" in FIG. 2A) is kept at substantially constant and a charging voltage ("L2" in FIG. 2A) is gradually increased (refer to "AC1" in FIG. 2A). Upon the charging voltage reaches a predetermined set value (threshold voltage; refer to "B0" in FIG. 2A) during the constant current charging operation, the control section 3 switches the charging operation into the constant voltage charging operation in which the charging voltage is kept at substantially constant and the charging current is gradually decreased (refer to "AC2" in FIG. 2A), and the control section 3 keeps to charge by the constant voltage charging operation. As shown in FIG. 2B, upon the charging current (which decreases gradually) reaches the charge stop current value (threshold current; refer to "A0" in FIG. 2B) during the constant voltage charging operation (i.e. upon the measured value by the current measurement section 30 becomes small enough to reach the charge stop current value A0), the control section 3 decides that the charge of the secondary battery 41 has been completed, and finishes the charging operation.

In this instance, the control section 3 of the present embodiment also has a function of a threshold current setting section 5 for determining the charge stop current value (threshold current) used for the charging operation. The threshold current setting section 5 changes the charge stop current value into a smaller value (which is smaller than the initial-value) according to the increased number of charging.

When performing the charging operation, the control section 3 as the threshold current setting section 5 determines "a charge stop current value for the present charging operation" based on the number of charging (lifetime information) and the initial-value of the charge stop current value (identification information) obtained from the memory 42. For example, as shown in FIG. 4, the threshold current setting section 5 changes the charge stop current value into a smaller value at each time that the number of charging reaches a predetermined numbers (every 100th times in the example of FIG. 4). In this instance, for example, the threshold current setting section 5 has a plurality of data tables each of which, as shown in FIG. 4, includes a relationship between the number of charging and the charge stop current value. When a battery pack 4 is mounted to the charger 2, the threshold current setting section 5 determines which data table to use based on the identification information (such as the initial-value of the charge stop current value). And then, the threshold current setting section 5 determines the charge stop current value based on the number of charging. Note that the threshold current setting section 5 may have a predetermined equation(s) which relates between the number of charging and the charge stop current value, instead of the data table(s).

Figure 3:
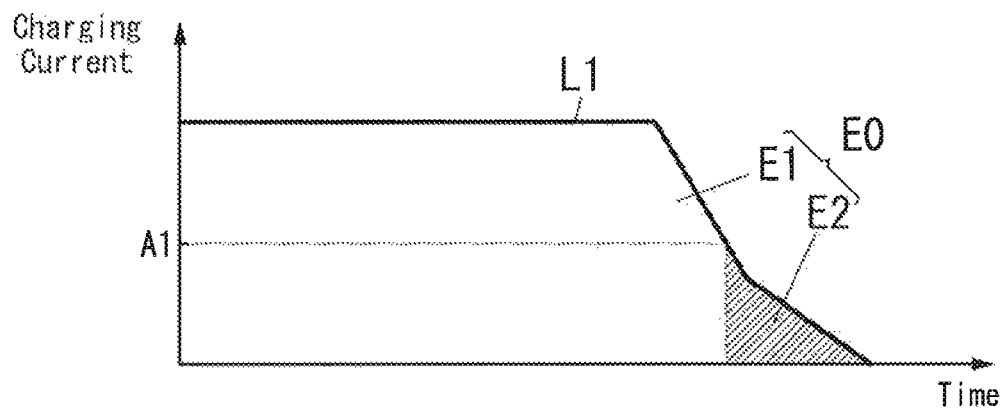
FIG. 3 is a diagram showing a charging current curve of the charge circuit according to the first embodiment of the present invention.
Figure 3:
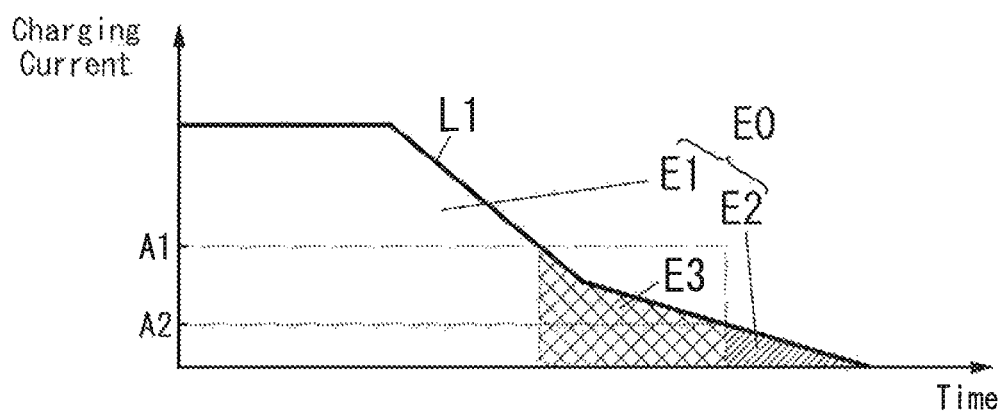

The charge stop current value determined by the threshold current setting section 5 is used in the constant voltage charging operation in the present charging operation. As shown in FIG. 3, the control section 3 performs the charging operation using the charge stop current value according to the number of charging. In case of charging the secondary battery 41 which has been repeatedly charged, the control section 3 performs the charging operation using "the charge stop current value for the repeatedly charged battery (refer to "A2" in FIG. 3B)" which is smaller than "the charge stop current value for the fresh battery (refer to "A1" in FIG. 3)".

In the following, the charge operation of the charge circuit 1 of the present embodiment is explained in other words.

When the terminals 7b of the battery pack 4 are connected to the terminals 7a of the charger 2, the control section 3 obtains the memory information (the identification information and the number of charging) from the memory 42 of the battery pack 4 through the terminals 74a, 74b. The control section 3 as the threshold current setting section 5 determines the charge stop current value using the memory information obtained from the memory 42 and the data table (e.g. the data table as shown in FIG. 4). Note that, the charge stop current value is set at smaller along with the increase of the number of charging.

At the time of starting the charging operation, the control section 3 obtains a present voltage value of the secondary battery 41 through the constant voltage control element 43.

If the obtained voltage value is smaller than the predetermined value (smaller than the threshold voltage B0), the control section 3 starts the charging operation by the constant current charging mode. In the constant current charging mode, the control section 3 controls the current output section 23 (the output power supply section) so as to keep the charging current measured by the current measurement section 30 at a predetermined value (at a target current value) with referring to the charging current measured by the current measurement section 30 and the voltage value of the secondary battery 41 input from the constant voltage control element 43 (constant current charging operation). Upon the voltage of the secondary battery 41 reaches the predetermined value (the threshold voltage B0) during the constant current charging operation, the control section 3 shifts into the constant voltage charging mode. In the constant voltage charging mode, the control section 3 controls the current output section 23 (the output power supply section) so as to keep the voltage of the secondary battery 41 at a predetermined value (at a target voltage value) with referring to the charging current measured by the current measurement section 30 and the voltage value input from the constant voltage control element 43 (constant voltage charging operation). That is, in the constant voltage charging operation, the control section 3 gradually decreases "the target current value" of the output current of the current output section 23 so as to keep the voltage of the secondary battery 41 at the target voltage value. Upon the target current value reaches the charge stop current value (A1, A2 or the like) determined by the threshold current setting section 5 during the constant voltage charging operation, the control section 3 finishes the charging operation.

If the obtained voltage value is equal to the predetermined value (equal to the threshold voltage B0), the control section 3 starts the charging operation by the constant voltage charging mode (constant voltage charging operation). Upon the target current value reaches the charge stop current value (A1, A2 or the like) determined by the threshold current setting section 5 during the constant voltage charging operation, the control section 3 finishes the charging operation.

If the obtained voltage value is larger than the predetermined value (larger than the threshold voltage B0), the control section 3 stops charging.

Note that, abovementioned "target voltage value" of the constant voltage charging operation is preferably equal to the "threshold voltage B0" of the constant current charging operation, but it may be different from each other.

Note that, the control section 3 adds the number of charging stored in the memory 42 by "one" at a predetermined timing during the charging operation. The control section 3 adds the number of charging when reading the memory information from the memory 42; or else, the control section 3 adds the number of charging when shifting from the constant current charging operation into the constant voltage charging operation; or else, the control section 3 adds the number of charging when finishing the constant voltage charging operation (i.e. finishing the charging operation); or else, the control section 3 adds the number of charging when continuously charging for a predetermined time period.

Figure 8:
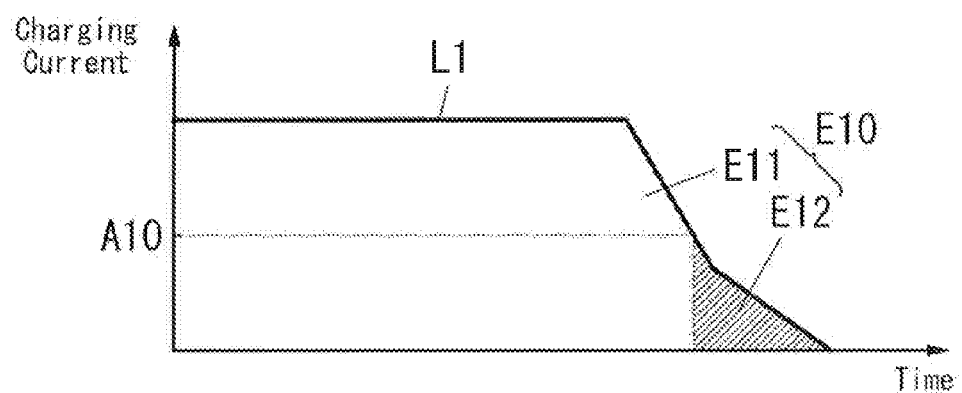
FIG. 8 is a diagram showing a charging current curve of a prior charge circuit.
Figure 8:
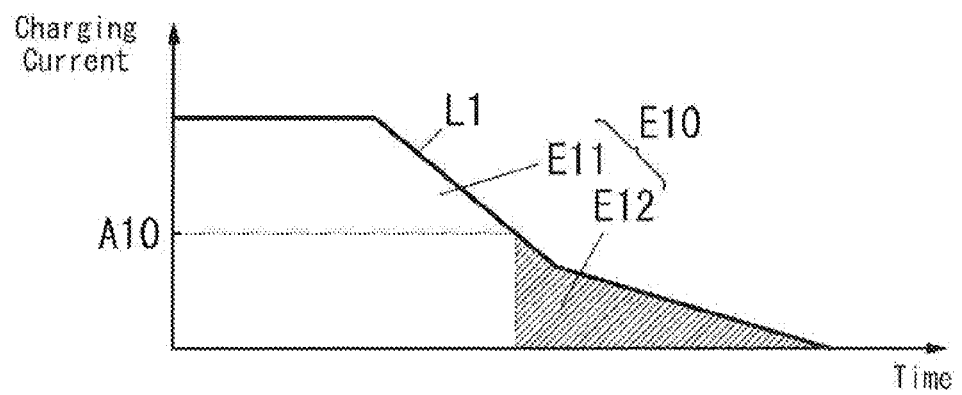

As described above, in the present embodiment, the charge stop current value is set at smaller along with the increase of the number of charging. Therefore, as shown in FIG. 3B, the present embodiment can charge the secondary battery 41 even at a period in which the prior charge circuit (which has an invariable charge stop current value) does not charge the secondary battery 41. As a result, the present embodiment can increase the charge amount of the repeatedly charged battery compared with the charge circuit which has an invariable charge stop current value. In other words, in the present embodiment, a part of the non-charging amount E12 (refer to FIG. 8) is shifted into a "charging amount E1" as shown in FIG. 3B (a part of non-charging amount E12 shifted into the charging amount E1 may be called as an "increased amount E3"). Therefore, a ratio of a non-charging amount E2 with respect to a chargeable amount E0 can be reduced compared with the prior charge circuit which has an invariable charge stop current value. As a result, the present embodiment can increase the charge amount of the repeatedly charged battery. That is, the present embodiment can performs the charging operation according to the number of charging. Therefore, the present embodiment can charge a sufficient amount of electric power to the repeatedly charged battery with compensating the reduction of charge amount due to the increase of the number of charging. Thus, the present embodiment improves the convenience of the battery pack 4.

Note that, the charger 2 includes the informing section 29 for informing such as operation conditions. The control section 3 controls the informing section 29. The informing section 29 is adapted to inform such as: connection condition with the external power supply 8; beginning of the charging operation; completion of the charging operation; abnormal state of the charger 2 or battery pack 4; or the like.

(Second Embodiment)

The charge circuit of the second embodiment of the present invention is explained with reference to FIG. 6. Note that, similar configuration with the first embodiment is not described below.

Figure 6:
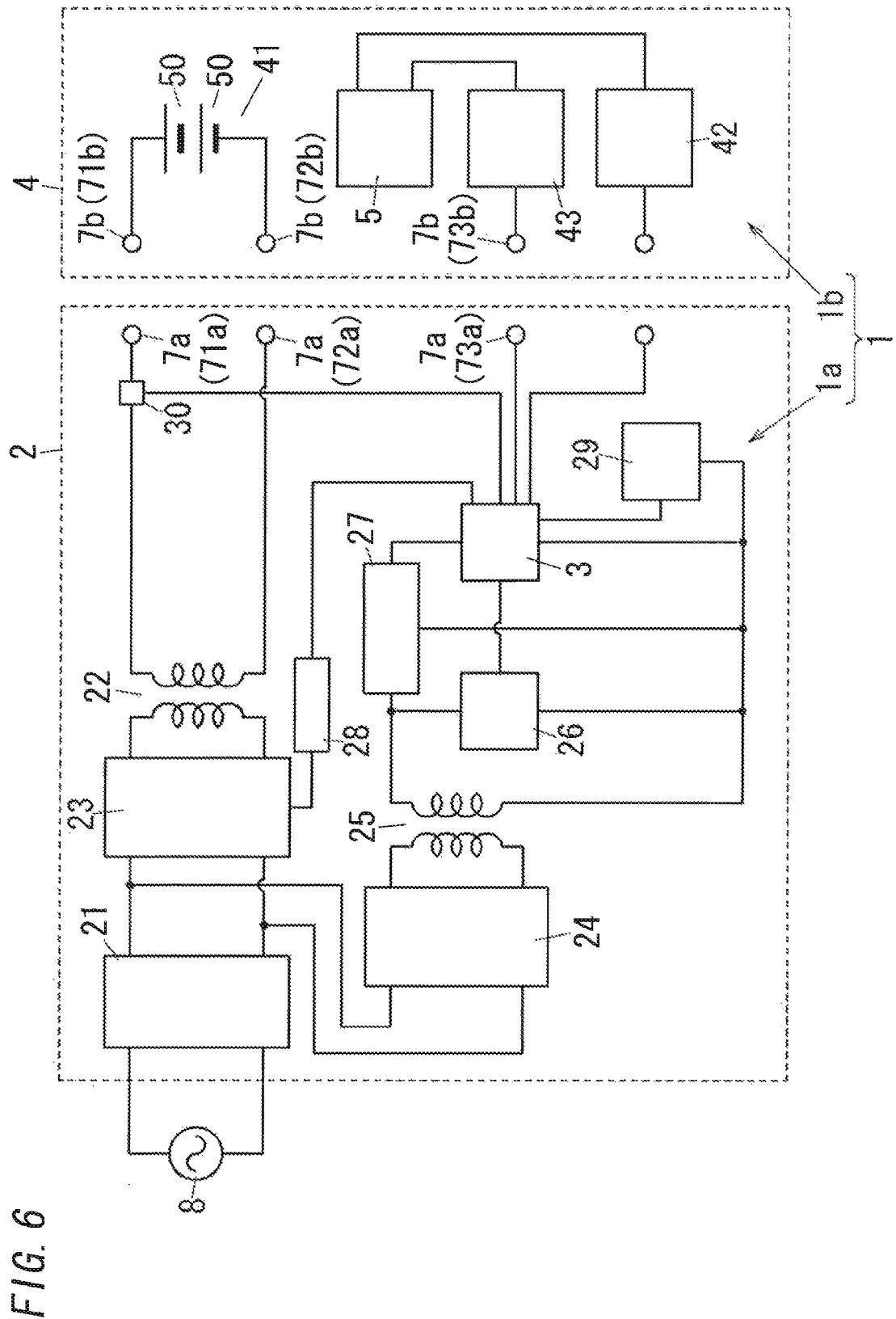
FIG. 6 is a circuit diagram of a charge circuit according to a second embodiment of the present invention.

In the present embodiment, as shown in FIG. 6, the threshold current setting section 5 is provided at the internal circuit (the second circuit) 1b of the battery back 4, and the charge stop current value (the threshold current) is changed (determined) at the battery back 4 side according to the number of charging. Then, the changed (determined) charge stop current value (threshold current) is sent to the internal circuit 1a (control section 3) of the charger 2 through the terminals 73a, 73b.

In detail, when the battery pack 4 is mounted to the charger 2, the threshold current setting section 5 in the battery pack 4 reads the memory information from the memory 42, and changes the charge stop current value into a smaller value according to the number of charging based on the memory information. Then, the threshold current setting section 5 outputs the result value (the changed charge stop current value) to the control section 3 through the terminals 73a, 73b. When the charge stop current value is input, the control section 3 uses this changed charge stop current value for the present charging operation.

Because the threshold current setting section 5 is provided at the battery back 4, the charge stop current value can be changed into a smaller value according to the number of charging at the battery back 4 side. And then, the control section 3 performs the charging operation using this changed charge stop current value. Therefore, the present embodiment can charge a sufficient amount of electric power to the repeatedly charged battery with compensating the reduction of charge amount due to the increase of the number of charging. Thus, the present embodiment improves the convenience of the battery pack 4.

In addition, because the charge stop current value is changed at the battery back 4 side, the charger 2 can performs the charging operation using the charge stop current value determined according to the number of charging, without having to change the charge stop current value at the charger 2 side. Therefore, even when the control section 3 does not have a function as the threshold current setting section 5 (that is, even when the charger 2 does not include threshold current setting section 5), the present embodiment can charge a sufficient amount of electric power to the repeatedly charged battery with compensating the reduction of charge amount due to the increase of the number of charging.

(Third Embodiment)

Figure 7:
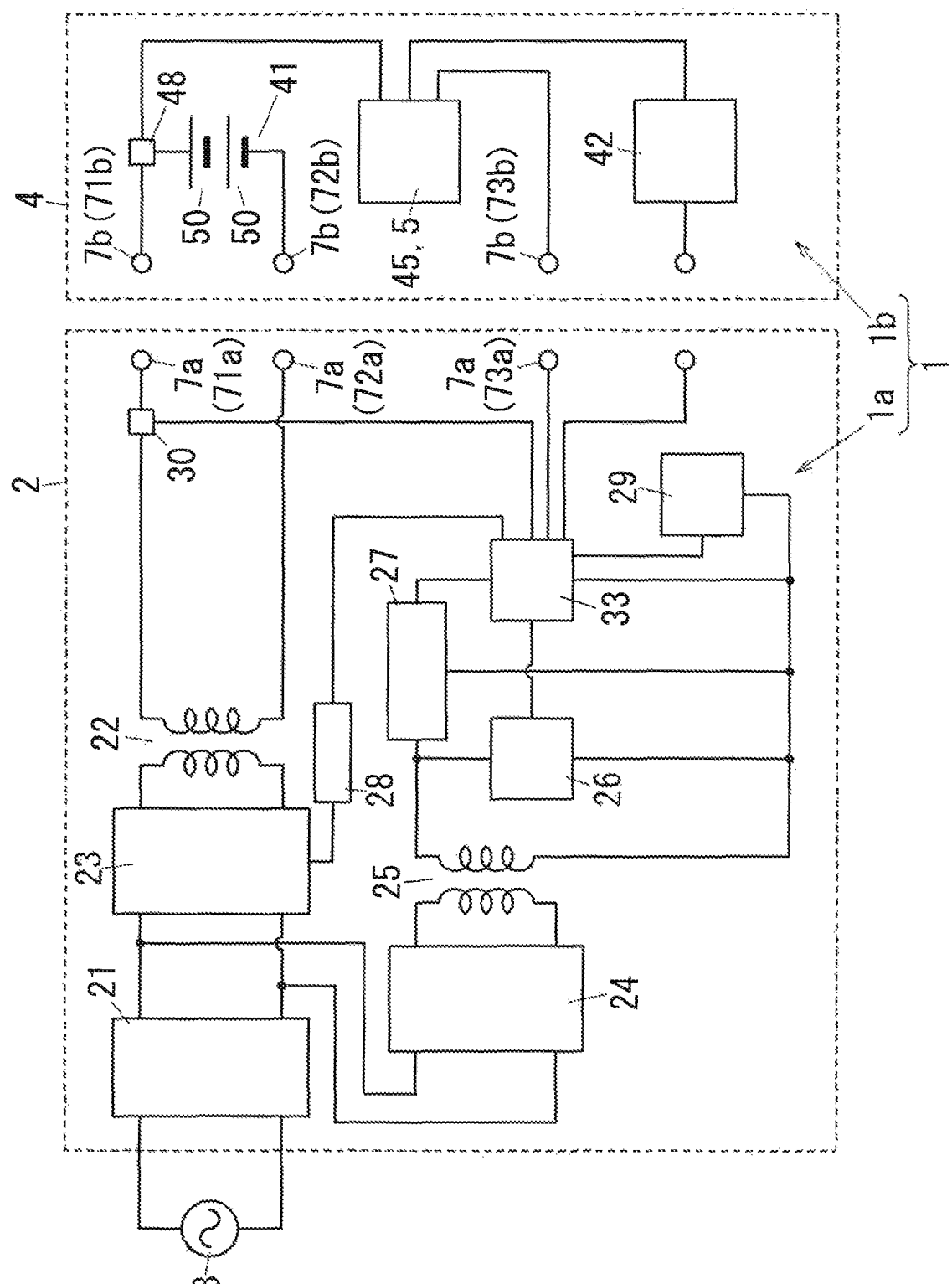
FIG. 7 is a circuit diagram of a charge circuit according to a third embodiment of the present invention.

The charge circuit of the third embodiment of the present invention is explained with reference to FIG. 7. Note that, similar configuration with the first embodiment is not described below.

In the present embodiment, the control section includes a charger side control section 33 provided at the internal circuit (the first circuit) 1a of the charger 2 and a battery side control section 45 provided at the internal circuit (the second circuit) 1b of the battery back 4. In addition, the battery side control section 45 has a function as the voltage measurement section for measuring the voltage of the secondary battery 41 and a function as the threshold current setting section 5. In the present embodiment, as shown in FIG. 7, the internal circuit 1b of the battery back 4 includes a battery side current measurement section 48 adapted to measure a current flowing from the charger 2 to the secondary battery 41.

In the present embodiment, the battery side control section 45 measures the voltage of the secondary battery 41 as well as measures the charging current through the battery side current measurement section 48. Besides, when the battery back 4 is mounted to the charger 2, the battery side control section 45 (the threshold current setting section 5) reads the memory information from the memory 42. And then, the battery side control section 45 (the threshold current setting section 5) determines the charge stop current value (i.e. changes the charge stop current value into a smaller value) according to the number of charging.

The battery side control section 45 of the present embodiment has a constant current charging mode and a constant voltage charging mode. In the constant current charging mode, the battery side control section 45 outputs (sends) a predetermined (constant) target current value to the charger side control section 33. The charger side control section 33 controls the current output section 23 (the output power supply section) so as to keep the measured current value by the current measurement section 30 at the target current value. In the constant voltage charging mode, the battery side control section 45 gradually decreases the target current value output to the charger side control section 33 so as to keep the voltage of the secondary battery 41 at a predetermined value (at the target voltage value). The charger side control section 33 controls the current output section 23 (the output power supply section) so that the measured current value by the current measurement section 30 corresponds to the target current value.

According to the charging operation of the charge circuit 1 of the present embodiment, the battery side control section 45 keeps the target current value output to the charger side control section 33 constant throughout a time period from starting time of the charging operation to a time point at which the voltage of the secondary battery 41 reaches the predetermined value (the threshold voltage B0). The charger side control section 33 controls the current output section 23 (the output power supply section) so as to keep the measured current value by the current measurement 30 at the target current value (constant current charging operation). Upon the voltage of the secondary battery 41 reaches the threshold voltage B0, the battery side control section 45 shifts into the constant voltage charging mode. In this mode, the battery side control section 45 gradually decreases the target current value so as to keep the voltage of the secondary battery 41 at the target voltage value (such as the threshold voltage B0). The charger side control section 33 controls the current output section 23 (the output power supply section) so that the measured current value by the current measurement 30 corresponds to the target current value (constant voltage charging operation). Upon the target current value reaches to the charge stop current value (i.e. the charging current measured by the battery side current measurement section 48 becomes small enough to reach the charge stop current value), the battery side control section 45 finishes the charging operation.

That is, in the present embodiment, the control section includes the charger side control section 33 provided at the first circuit 1a and the battery side control section 45 provided at the second circuit 1b. The second circuit 1b is provided with the battery side current measurement section 48 configured to measure the current flowing from the output power supply section to the secondary battery 41. The battery side control section 45 is configured to send a target current value to the charger side control section 33 with referring to the voltage of the secondary battery 41 and the measured current value by the battery side current measurement section 48. In the constant current charging operation, the battery side control section 45 sends the target current value of a constant value to the charger side control section 33, and the charger side control section 33 controls the output power supply section so as to keep the measured current value by the current measurement section 30 at the target current value. In the constant voltage charging operation, the battery side control section 45 is configured to gradually decrease the target current value sent to the charger side control section 33 so as to keep the voltage of the secondary battery 41 constant, and the charger side control section 33 controls the output power supply section so that the measured value by the current measurement section 30 corresponds to the target current value.

According to the present embodiment, the battery side control section 45 of the battery pack 4 adjusts the target current value during each of the constant current charging operation and the constant voltage charging operation. That is, in the present embodiment, the charger side control section 33 only needs to have a function of controlling the charging current based on the target current value sent from the battery side control section 45.

The present embodiment also can charge a sufficient amount of electric power to the repeatedly charged battery with compensating the reduction of charge amount due to the increase of the number of charging. Thus, the present embodiment improves the convenience of the battery pack 4.

Note that, the present invention is not limited to the above described embodiments, and numerous modifications and variation can be made without departing from the true spirit and scope of the present invention, namely claims.

For example, in the first embodiment, the control section 3 and the threshold current setting section 5 can be separately provided at the charger 2. In this configuration, the threshold current setting section 5 reads the memory information from the memory 42, determines the charge stop current value (changes the charge stop current value into a smaller value) according to the number of charging in the memory information, and outputs the changed charge stop current value into the control section 3.

For example, the threshold current setting section 5 may determine the charge stop current value so that a charging time of the present charging is correspondent to a charging time of the fresh battery. With this configuration, even when charging the repeatedly charged battery, the charging operation finishes at the same time with the charging of the fresh battery.

For example, the memory 42 may store the data table(s) as shown in FIG. 4 which includes a relationship between the number of charging and the charge stop current value. Then, the threshold current setting section 5 may read the data table and the number of charging from the memory 42, and determine the charge stop current value according to the number of charging. With this configuration, the threshold current setting section 5 can determine the charge stop current value (change the charge stop current value into a smaller value) without using the identification information (such as the initial-value of the charge stop current value) of the battery pack 4. Therefore, the threshold current setting section 5 is not need to obtain the initial-value, or the memory 42 is not need to store the identification information (such as the initial-value).

For example, the charger 2 is not limited to include the above output power supply section to which an electric power is supplied from the external power supply 8. That is, the output power supply section of the charge 2 may be an internal power supply such as a power generator, and thereby the charger 2 may charge the secondary battery 41 using the electric power generated by the internal power supply.

The invention claimed is:

1. A battery-charger assemblage comprising:
    at least one battery packs each of which is provided with a secondary battery;
    at least one charger for charging said secondary battery of each battery pack; and
    a charge circuit composed of a first circuit provided to each charger and a second circuit provided to each battery pack,
    wherein said first circuit comprises:
    an output power supply section which is configured to output an electric power to said secondary battery;
    a control section which is configured to control said output power supply section to perform a charging operation, wherein said control section is configured to, in said charging operation, perform first a constant current charging operation, perform a constant voltage charging operation after finishing the constant current charging operation, and finish the charging operation when a charging current reaches a charge stop current value; and
    a threshold current setting section that has a plurality of data tables each of which includes a relationship between a number of charging defined as the number of times of performing said charging operation and a charge stop current value, and is configured to determine said charge stop current value,
    wherein said second circuit comprises a memory which stores a number of charging of the corresponding second battery,
    wherein said threshold current setting section is configured to decrease said charge stop current value along with the increase of said number of charging,
    wherein, when performing said charging operation, said threshold current setting section is configured to obtain identification information and the number of charging from said memory of said battery pack attached to said charger, determine a data table to be used based on the obtained identification information, and determine said charge stop current value based on obtained the number of charging.

2. A battery-charger assemblage comprising:
    at least one battery packs each of which is provided with a secondary battery;
    at least one charger for charging said secondary battery of each battery pack; and
    a charge circuit composed of a first circuit provided to each charger and a second circuit provided to each battery pack,
    wherein said first circuit comprises:
    an output power supply section which is configured to output an electric power to said secondary battery; and
    a control section which is configured to control said output power supply section to perform a charging operation, wherein said control section is configured to, in said charging operation, perform first a constant current charging operation, perform a constant voltage charging operation after finishing the constant current charging operation, and finish the charging operation when a charging current reaches a charge stop current value,
    wherein said second circuit comprises:
    a memory which stores a number of charging defined as the number of times of performing said charging operation; and
    a threshold current setting section configured to determine said charge stop current value,
    wherein said threshold current setting section is configured to decrease said charge stop current value along with the increase of said number of charging,
    wherein said memory of each second circuit is configured to store a data table which includes a relationship between a number of charging of the corresponding secondary battery and a charge stop current value,
    wherein said threshold current setting section is configured to read said data table and obtain said number of charging from said memory and to determine said charge stop current value according to obtained the number of charging, and
    wherein said control section uses said charge stop current value supplied from said battery pack, for the present charging operation.

3. A battery-charger assemblage comprising:
    at least one battery packs each of which is provided with a secondary battery;
    at least one charger for charging said secondary battery of each battery pack; and
    a charge circuit composed of a first circuit provided to each charger and a second circuit provided to each battery pack,
    wherein said first circuit comprises:
    an output power supply section which is configured to output an electric power to said secondary battery;
    a current measurement section configured to measure a current flowing from said output power supply section to said secondary battery; and
    a charger side control section which is configured to control said output power supply section to perform a charging operation, wherein said control section is configured to, in said charging operation, perform first a constant current charging operation, perform a constant voltage charging operation after finishing the constant current charging operation, and finish the charging operation when a charging current reaches a charge stop current value,
    wherein said second circuit comprises:
    a voltage measurement section configured to measure a voltage of the corresponding secondary battery;
    a memory which stores a number of charging defined as the number of times of performing said charging operation;
    a threshold current setting section configured to determine said charge stop current value;

a battery side current measurement section configured to measure a current flowing from said charger to said secondary battery; and a battery side control section, wherein said threshold current setting section is configured to decrease said charge stop current value along with the increase of said number of charging, wherein, in said constant current charging operation, said battery side control section sends a target current value of a constant value to said charger side control section, and said charger side control section controls said output power supply section so as to keep the measured current value by said current measurement section at said target current value; in said constant voltage charging operation, said battery side control section gradually decreases said target current value sent to said charger side control section, so as to keep the voltage of said secondary battery at constant, and said charger side control section controls said output power supply section so that the measured value by said current measurement section corresponds to said gradually decreasing target current value; and upon the charge current measured by said battery side measurement section becomes small to reach said charge stop current value, said battery side control section finishes said charging operation.

* * * * *